United States Patent [19]
Carr

[11] Patent Number: 5,062,191
[45] Date of Patent: Nov. 5, 1991

[54] LOCKING RING TOOL

[76] Inventor: Luther J. Carr, P. O. Box 51, Road 1002, Hessel, N.C. 27841

[21] Appl. No.: 594,419

[22] Filed: Oct. 9, 1990

[51] Int. Cl.[5] .............................................. B23P 19/04
[52] U.S. Cl. ........................................ 29/229; 29/268; 81/302; 81/371
[58] Field of Search ................. 29/229, 225, 268, 302; 81/300, 416–417, 423, 485, 486, 370, 371

[56] References Cited

U.S. PATENT DOCUMENTS 2,546,616 3/1951 Schaaff ................................. 29/229
3,484,924 12/1969 Dahl ..................................... 29/229

FOREIGN PATENT DOCUMENTS 715747 8/1965 Canada ................................ 29/268

*Primary Examiner*—Robert C. Watson
*Attorney, Agent, or Firm*—Leon Gilden

[57] ABSTRACT

An apparatus wherein a pivoted jaw structure is provided, with spaced relatively pivotal mounted support pins for securing a locking type ring in a fixed relationship, the tool includes a fixed lever with a pivoted jaw mounted thereto, wherein the pivot jaw includes a locking and release lever arrangement associated with the pivoted jaw to lock the spaced support pins in a fixed relationship.

1 Claim, 3 Drawing Sheets

PRIOR ART

LOCKING RING TOOL

BACKGROUND OF THE INVENTION

1. Field of the Invention

The field of invention relates to locking ring tools, and more particularly pertains to a new and improved locking ring tool wherein the same permits fixed spacing of the locking ring prior to securement to an associated mounting environment.

2. Description of the Prior Art

Various locking ring tools have been utilized in the prior art to grasp and secure the locking rings prior to mounting. Such tools may be found in U.S. Pat. No. 4,416,045 to Staten wherein a snap-ring tool utilizes pivoted jaws biased relative to one another that permit spreading of a locking ring for removal of the locking ring relative to an associated structure.

U.S. Pat. No. 4,776,245 to Gustavson sets forth locking ring pliers utilizing pivoted jaws operative through relative pivoted levers for effecting spacing of the jaws relative to one another.

U.S. Pat. No. 4,625,379 to Anderson sets forth a locking ring tool wherein the jaws are mounted relative to one another and may be switched relative to associated handles to effect selective spreading or closing of the support pins upon manual manipulation of the handles.

U.S. Pat. No. 4,316,315 to Vogelnik sets forth a prior arrangement for securing a locking ring structure as a further example of structure to selectively spread or associate relative support pins of the tool structure.

As such, it may be appreciated that there continues to be a need for a new and improved locking ring tool as set forth by the instant invention which addresses both the problems of ease of use as well as effectiveness in construction and in this respect, the present invention substantially fulfills this need.

SUMMARY OF THE INVENTION

In view of the foregoing disadvantages inherent in the known types of locking ring tools now present in the prior art, the present invention provides a locking ring tool wherein the same provides locking lever structure to selectively lock relative jaws mounting support posts for engagement within a locking ring. As such, the general purpose of the present invention, which will be described subsequently in greater detail, is to provide a new and improved locking ring tool which has all the advantages of the prior art locking ring tools and none of the disadvantages.

To attain this, the present invention provides an apparatus wherein a pivoted jaw structure is provided, with spaced relatively pivotal mounted support pins for securing a locking type ring in a fixed relationship, the tool includes a fixed lever with a pivoted jaw mounted thereto, wherein the pivot jaw includes a locking and release lever arrangement associated with the pivoted jaw to lock the spaced support pins in a fixed relationship.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved locking ring tool which has all the advantages of the prior art locking ring tools and none of the disadvantages.

It is another object of the present invention to provide a new and improved locking ring tool which may be easily and efficiently manufactured and marketed.

It is a further object of the present invention to provide a new and improved locking ring tool which is of a durable and reliable construction.

An even further object of the present invention is to provide a new and improved locking ring tool which is susceptible of a low cost of manufacture with regard to both materials and labor, and which accordingly is then susceptible of low prices of sale to the consuming public, thereby making such locking ring tools economically available to the buying public.

Still yet another object of the present invention is to provide a new and improved locking ring tool which provides in the apparatuses and methods of the prior art some of the advantages thereof, while simultaneously overcoming some of the disadvantages normally associated therewith.

Still another object of the present invention is to provide a new and improved locking ring tool wherein the same provides ease of mounting of the tool within a relatively positioned support ring and permitting locking of the support ring in an expanded orientation for subsequent mounting to an associated receiving structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
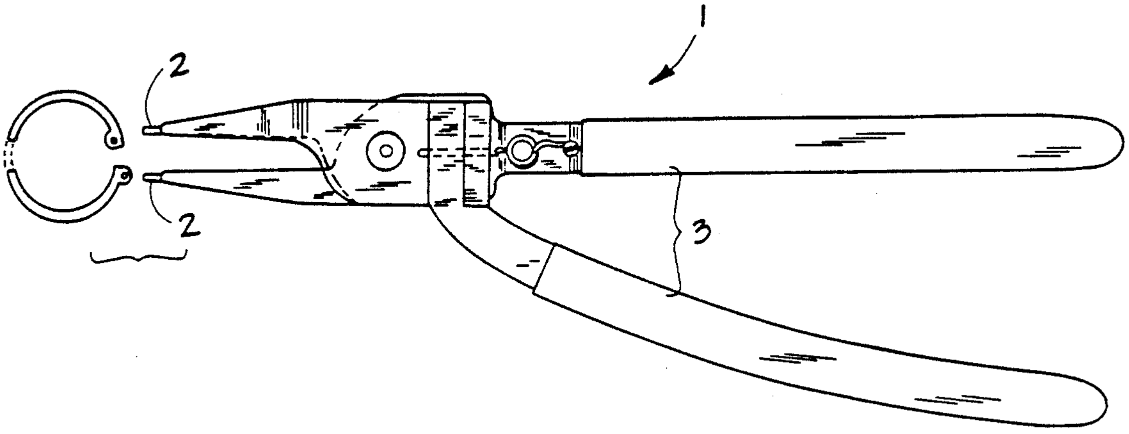
FIG. 1 is an orthographic side view, taken in elevation, of a prior art locking ring tool.

With reference now to the drawings, and in particular to FIGS. 1 to 5 thereof, a new and improved locking ring tool embodying the principles and concepts of the present invention and generally designated by the reference numeral 10 will be described.

Figure 2:
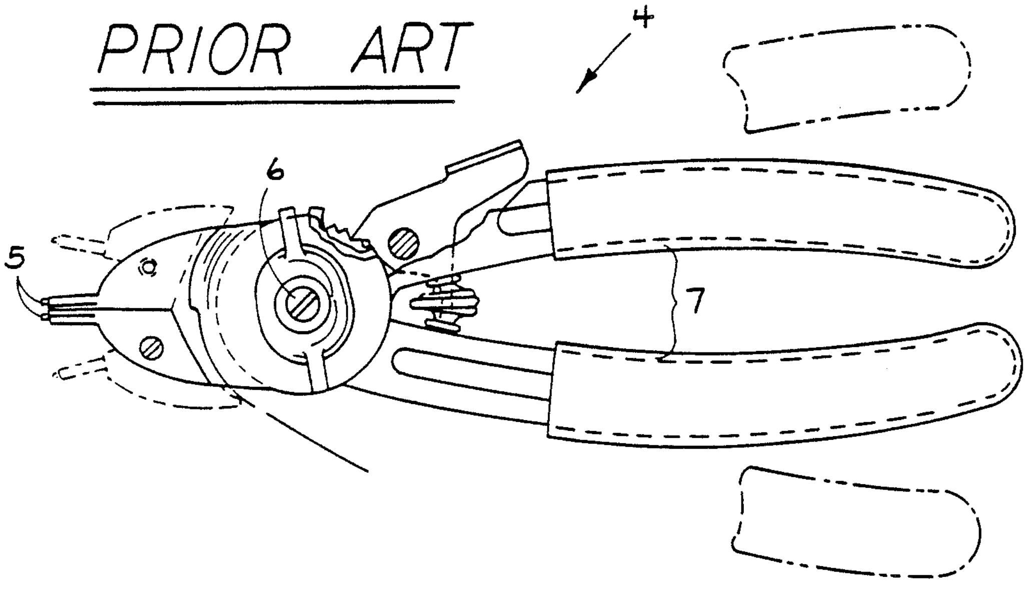
FIG. 2 PRIOR ART
FIG. 2 is an orthographic tool of a further example of a prior art locking ring tool.

FIG. 1 illustrates a prior art locking ring tool 1 utilizing support posts operative through relatively manipulatable levers 3 to mount a locking type ring or circlip, in a manner as set forth in U.S. Pat. No. 4,776,245. Further, the locking ring tool, as illustrated in FIG. 2, sets forth a pivot structure to mount support post 5 relative to operative handle 7, wherein the post 5 may be switched relative to the handle 7 to permit selective spreading or contracting of an associated locking ring, in a manner as set forth in U.S. Pat. No. 4,625,379.

Figure 3:
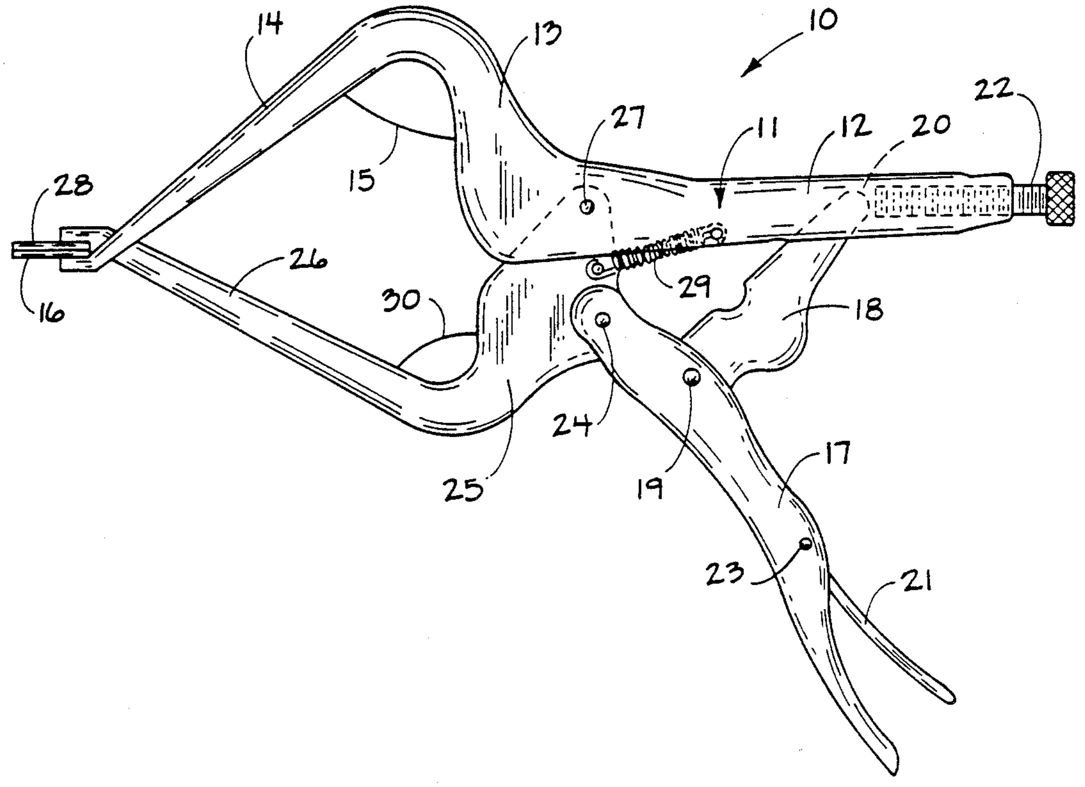
FIG. 3 is an orthographic side view, taken in elevation, of the instant invention.
Figure 4:
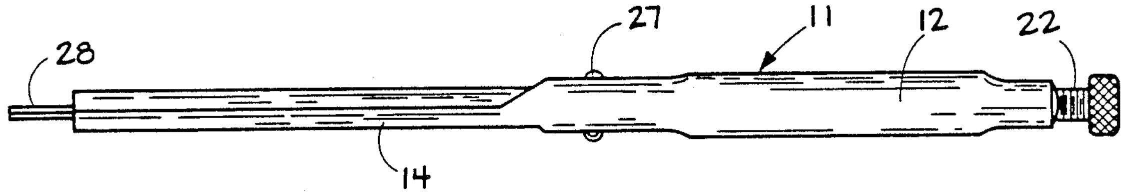
FIG. 4 is an orthographic top view of the instant invention.
Figure 5:
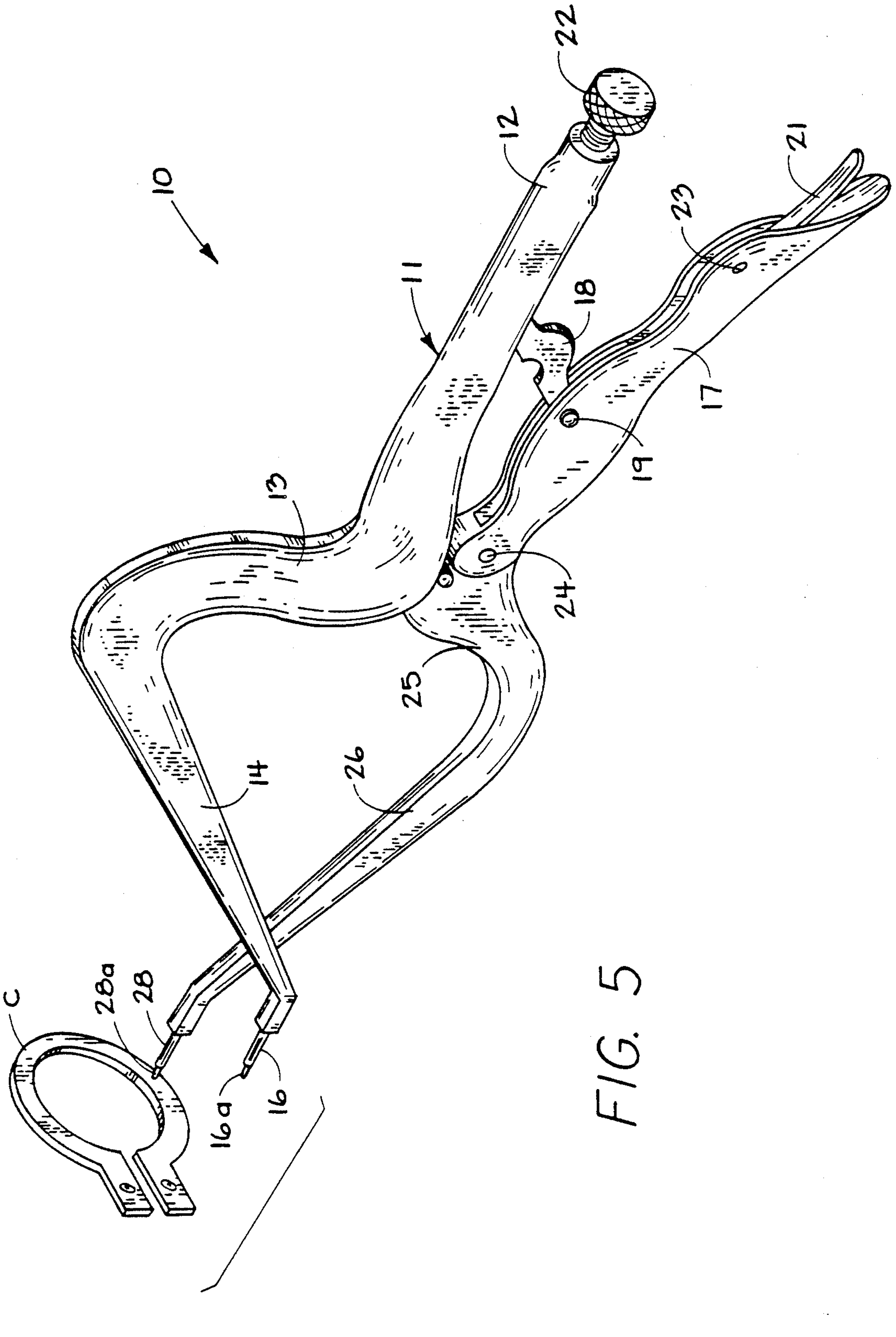
FIG. 5 is an isometric illustration of the instant invention.

More specifically, the locking ring tool 10 of the instant invention essentially comprises an elongate fixed leg 11, including a first leg portion 11 defined by an elongate channel 12. The elongate channel 12 includes a second leg portion 13 oriented generally orthogonally and upwardly relative to the first leg portion 12. A third leg portion 14 is integrally mounted to the second leg portion 13 and defines an acute included angle 15 therebetween. The third leg portion 14 terminates in a first support pin 16 that is oriented parallel to a longitudinal axis defined by the second leg portion 13. A first pivot leg 17 includes an adjusting link 18 mounted to a first pivot 19 adjacent a forward end of the first pivot leg 17, with an arcuate adjusting link heel 20 formed at a rear terminal end of the adjusting link 18 spaced from the first pivot 19 to cooperate with a forward end of adjusting screw 22 that is threadedly mounted within an elongate channel of the first leg portion 12 to effect adjustment of the first pivot leg 17 relative to the first leg portion 12. A release link 21 is mounted to a second pivot 23 spaced from the first pivot 19 to effect subsequent release of the spaced jaws. The first pivot leg 17 is pivotally mounted at its forward end through a third pivot 24 to a second pivoted leg 25. The second pivoted leg 25 pivots from a first position, as illustrated in FIG. 3, wherein the second pivoted leg 25 and the second leg portion 13 are generally aligned relative to one another to a second position to define an acute included angle between the second leg portion 13 and the second pivot leg 25. A projecting leg 26 defines an acute angle 30 between a projecting leg 26 and the second pivot leg 25, with a second support pin 28 fixedly mounted at a forward terminal end of the projection leg 26 for alignment and contiguous contact with the first support pin 16 when the third leg portion 14 and the projecting leg 26 are in the first position, as illustrated in FIG. 3. A fourth pivot 27 pivotally mounts the second pivot leg 25 to the fixed leg 11 at a junction of the second leg portion 13 and the first leg portion 12, with a return spring 29 biasing the third leg portion 14 and the projecting leg 26 to the first position. If desired, a conically beveled first forward end 16a and a second conically beveled forward end 28a may be formed to the forward terminal ends of the first and second support pins, as illustrated in FIG. 5 for example.

In this manner, the support pins may be spread and fixed in desired spread configuration to spread an associated locking ring "C" relative to a mounting structure for securement to such mounting structure, or alternatively removal therefrom.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A locking ring tool comprising, in combination, a fixed leg, including a first leg portion, with a second leg portion orthogonally mounted at a forward end of the first leg portion, with a third leg portion integrally mounted at a first acute included angle between the second leg portion and the third leg portion, and a first support pin mounted at a forward terminal end of the first leg portion, and a first pivot leg pivotally mounted to a second pivoted leg, with the second pivot leg mounted to the fixed leg, and the second pivot leg including a projecting leg defining a second acute included angle between the projecting leg and the second pivot leg, and a second support pin fixedly mounted to a forward terminal end of the projecting leg, with the second support pin positioned coextensive, contiguous, and parallel with the first support pin in a first position, and spaced from the first support pin in a second position, and wherein the second pivot leg is pivotally mounted to the fixed leg at a junction defined by the first leg portion and the second leg portion, and wherein the first support pin is arranged parallel to the first leg portion, and wherein the second pivot leg is aligned with the second leg portion in a first position, with the second pivot leg defining a further acute angle between the second leg portion and the second pivoted leg in the second position, and wherein the first pivot leg includes an adjusting link, with the adjusting link including an adjusting link pivot pivotally mounting the adjusting link rearwardly of the second pivot leg, and the adjusting link including an arcuate rear terminal end spaced from the first pivot leg cooperatively positioned within the first leg portion to cooperate with a forward terminal end of an adjusting screw threadedly mounted within a terminal end of the first leg position.

* * * * *